(12) United States Patent
Tetsuka et al.

(10) Patent No.: US 10,290,394 B2
(45) Date of Patent: May 14, 2019

(54) CABLE

(71) Applicant: TSUBAKIMOTO CHAIN CO., Osaka-shi, Osaka (JP)

(72) Inventors: Takayuki Tetsuka, Osaka (JP); Masashi Kunii, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/571,327

(22) PCT Filed: May 30, 2016

(86) PCT No.: PCT/JP2016/065852
§ 371 (c)(1),
(2) Date: Nov. 2, 2017

(87) PCT Pub. No.: WO2016/199601
PCT Pub. Date: Dec. 15, 2016

(65) Prior Publication Data
US 2018/0114611 A1 Apr. 26, 2018

(30) Foreign Application Priority Data
Jun. 9, 2015 (JP) .................................. 2015-116556

(51) Int. Cl.
*H01B 11/04* (2006.01)
*H01B 7/04* (2006.01)
(Continued)

(52) U.S. Cl.
CPC ................. *H01B 7/04* (2013.01); *H01B 7/02* (2013.01); *H01B 7/223* (2013.01);
(Continued)

(58) Field of Classification Search
CPC ............ H01B 11/04; F16L 3/01; F16L 3/1226
(Continued)

(56) References Cited

U.S. PATENT DOCUMENTS 4,445,593 A * 5/1984 Coleman ................. B66B 7/064
174/113 C
5,122,622 A * 6/1992 Reuss .................... H01B 7/041
174/107

(Continued)

FOREIGN PATENT DOCUMENTS

CN 102235550 A 11/2011
CN 203520973 U 4/2014
(Continued)

OTHER PUBLICATIONS

International Preliminary Report on Patentability (Form PCT/IB/373) issued in counterpart International Application No. PCT/JP2016/065852 dated Dec. 12, 2017, with Form PCT/ISA/237 (5 pages).
(Continued)

*Primary Examiner* — Chau N Nguyen
(74) *Attorney, Agent, or Firm* — Westerman, Hattori, Daniels & Adrian, LLP (57) ABSTRACT

A cable includes a flexible coated wire, a multi joint support member, and a flexible sheath member that covers the multi joint support member and the coated wire. The multi-joint support member is formed by pivotally coupling adjacent ones of a plurality of link members arranged in series. Turning of the multi joint support member in a first direction in a direction intersecting a serial direction is allowed until becoming equal to a predetermined radius of curvature and turning of the multi joint support member in a second direction, which is opposite to the first direction, is restricted.

8 Claims, 6 Drawing Sheets

(51) Int. Cl.
*H02G 11/00* (2006.01)
*H01B 7/02* (2006.01)
*H01B 7/22* (2006.01)
*H02G 3/04* (2006.01)
*F16G 13/16* (2006.01)

(52) U.S. Cl.
CPC ........... *H02G 3/0475* (2013.01); *H02G 11/00* (2013.01); *F16G 13/16* (2013.01); *H01B 7/041* (2013.01)

(58) Field of Classification Search
USPC .............. 174/113 R, 115, 116; 248/68.1, 73; 59/78.1
See application file for complete search history.

(56) References Cited

U.S. PATENT DOCUMENTS

| | | | | |
|---|---|---|---|---|
| 8,872,033 | B2* | 10/2014 | Oka | H01B 7/225 174/110 R |
| 9,040,826 | B2* | 5/2015 | Oka | H01B 5/10 174/113 C |
| 2011/0240805 | A1* | 10/2011 | Komiya | F16G 13/20 248/68.1 |
| 2012/0187271 | A1 | 7/2012 | Komiya | |

FOREIGN PATENT DOCUMENTS

| | | |
|---|---|---|
| JP | 2004-350405 A | 12/2004 |
| JP | 2011-214704 A | 10/2011 |
| JP | 2012-146542 A | 8/2012 |
| JP | 2012-149752 A | 8/2012 |
| TW | M376878 U1 | 3/2010 |
| TW | 201231841 A | 8/2012 |

OTHER PUBLICATIONS

International Search Report dated Jun. 21, 2016, issued in counterpart International Application No. PCT/JP2016/065852 (1 page).
Office Action dated Sep. 30, 2017, issued in counterpart Taiwanese application No. 105117518 (5 pages including appendix).
Office Action dated Nov. 15, 2018, issued in counterpart Chinese Application No. 201680031316.4, with English machine translation. (12 pages).
Office Action dated Nov. 20, 2018, issued in counterpart Korean Application No. 10-2017-7036331, with English translation. (9 pages).

* cited by examiner

CABLE

BACKGROUND OF THE INVENTION

The present invention relates to a cable that supplies, for example, electric power.

Such type of a cable known in the art includes a coated electric wire that has a conductor and a coating portion that coats the conductor, an insulative sheath portion that covers the coated electric wire, and a filler that fills the space between an inner side of the insulative sheath portion and an outer side of the coated electric wire (for example, patent document 1). Such a cable is flexible and configured to be freely bent.

PRIOR ART DOCUMENT

Patent Document

Patent Document 1: Japanese Laid-Open Patent Publication No. 2012-146542

SUMMARY OF THE INVENTION

The above cable can be freely bent in any direction. Thus, when the cable is used to reciprocate a movable body in a horizontal direction with a first end fixed to a fixed portion and a second end fixed to the movable body that is located above the fixed portion, the cable moves while elastically defaming as it follows the reciprocation of the movable body. However, the path of the cable is unstable.

Accordingly, it is an object of the present invention to provide a cable that stabilizes its path when the first end and the second end are moved relative to each other while forming a curved portion at its intermediate portion.

A cable that solves the above problem includes a flexible transmission member and a multi-joint support member famed by pivotally coupling adjacent ones of a plurality of link members arranged in series. Turning of the multi-joint support member in a first direction in a direction intersecting a serial direction is allowed until becoming equal to a predetermined radius of curvature and turning of the multi-joint support member in a second direction, which is opposite to the first direction, is restricted. The cable also includes a flexible sheath member that covers the multi-joint support member and the transmission member.

In this structure, the multi-joint support member is turned only in the first direction. This stabilizes the path of the cable when relatively moving the first end and the second end while forming the curved portion at its intermediate portion.

It is preferred that the multi-joint support member be covered by a flexible cover member.

This structure allows the cover member to protect the transmission member from the multi-joint support member.

It is preferred that the multi-joint support member be arranged in a central portion of the sheath member and that the transmission member be arranged between the multi-joint support member and the sheath member.

In this structure, the multi-joint support member is arranged in the central portion of the sheath member where stress received by the cable during use of the cable is largest. This limits stress received by the transmission member.

It is preferred that the multi-joint support member be formed from a synthetic resin.

This structure reduces the weight of the multi-joint support member as compared to when the multi-joint support member is famed from metal.

It is preferred that the multi-joint support member be one of a plurality of multi-joint support members and that the sheath member cover the plurality of multi-joint support members.

This structure further increases the rigidity of the cable.

The present invention stabilizes the path of the cable when relatively moving the first end and the second end while forming the curved portion at its intermediate portion.

DETAILED DESCRIPTION OF THE PREFERRED EMBODIMENTS

One embodiment of a cable will now be described with reference to the drawings.

Figure 1:
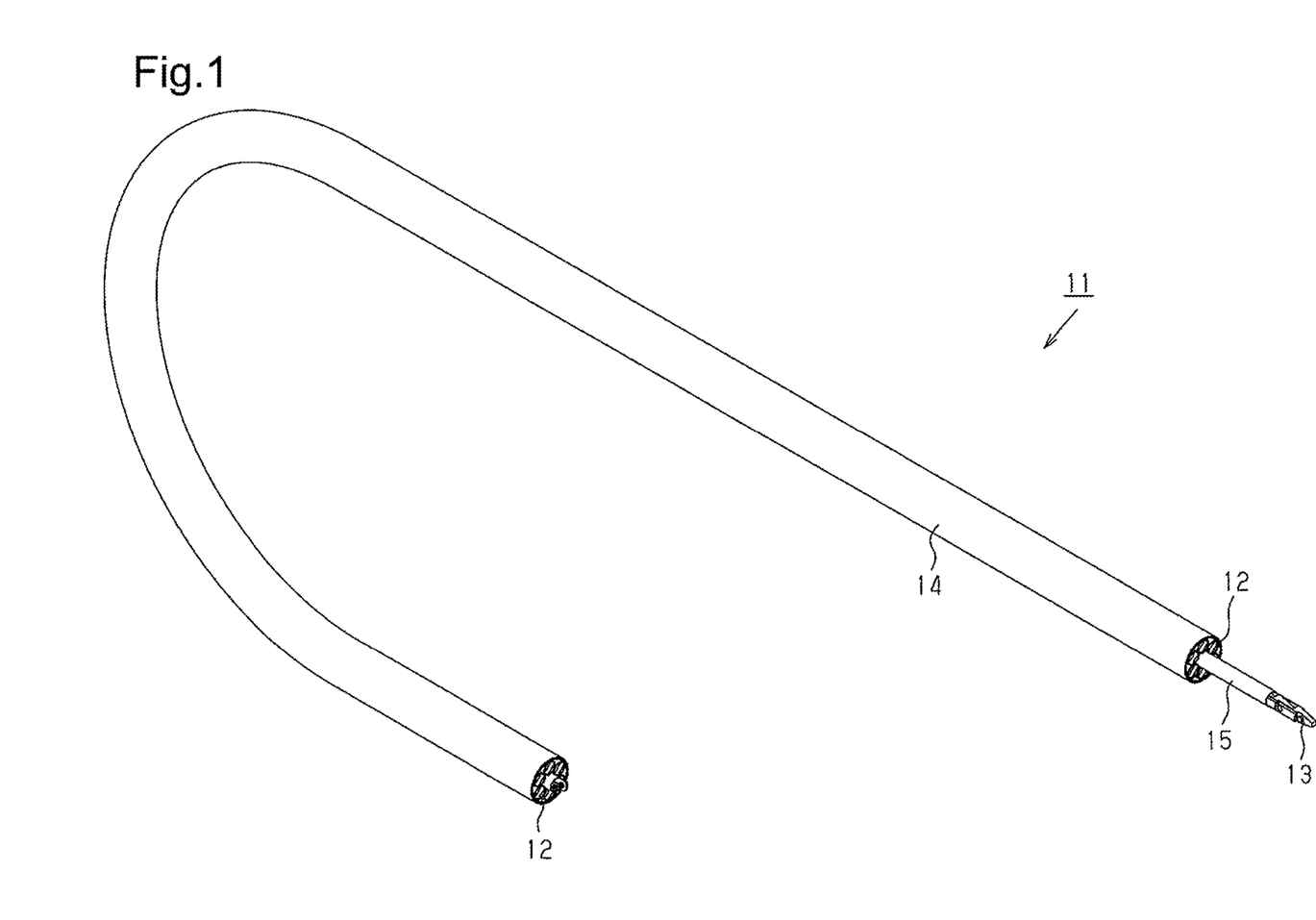
FIG. 1 is a partially cutaway perspective view showing one embodiment of a cable.
Figure 2:
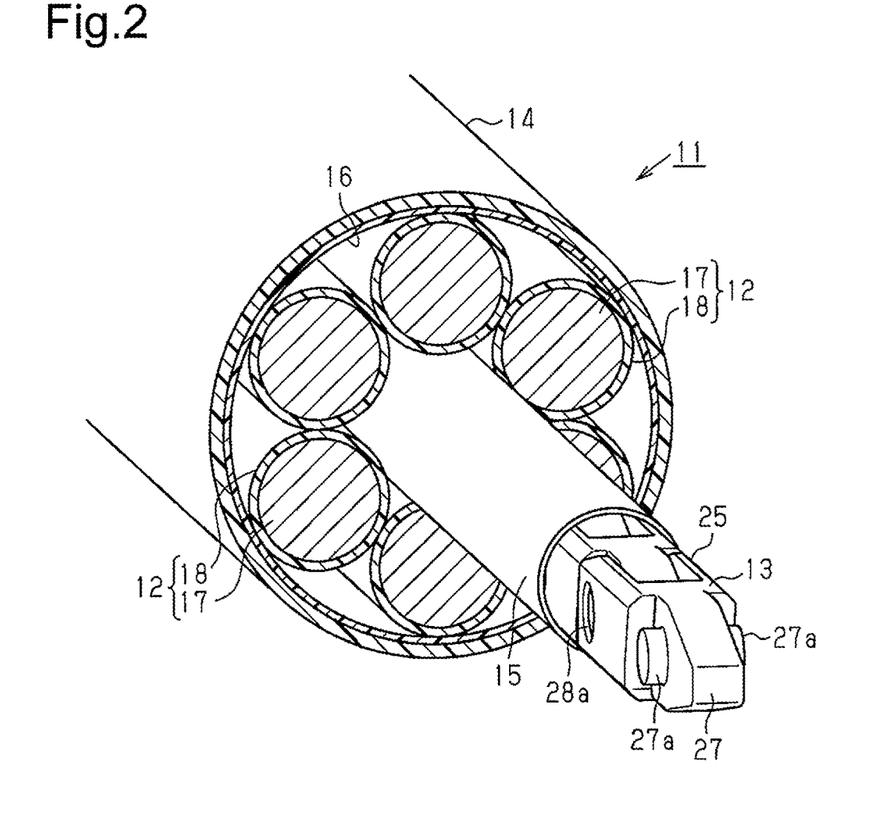
FIG. 2 is an enlarged view showing a main section of the cable of FIG. 1.

As shown in FIGS. 1 and 2, a cable 11 includes a plurality of elongated coated wires 12, which serve as flexible transmission members, an elongated multi-joint support member 13, and a flexible sheath member 14 that covers the multi-joint support member 13 and the coated wires 12. The sheath member 14 is elongated and tubular. In more detail, the cable 11 is famed by inserting six coated wires 12 and one multi-joint support member 13 into the sheath member 14.

The multi-joint support member 13 is covered by a flexible cover member 15, which is elongated and tubular, and arranged in the central portion of the sheath member 14. The multi-joint support member 13 and the cover member 15 are each famed from a synthetic resin. Each of the six coated wires 12 is formed by coating an electric wire 17 with an insulator 18 such as a synthetic resin. The six coated wires 12 are arranged between the multi-joint support member 13 and the sheath member 14 to surround the multi-joint support member 13. A wire wrap 16 is spirally wound around the six coated wires 12 over the entire length of the coated wires 12 from the outside to bundle and cover the six coated wires 12. The sheath member 14 is formed from an insulative material such as rubber or synthetic resin.

Figure 3:
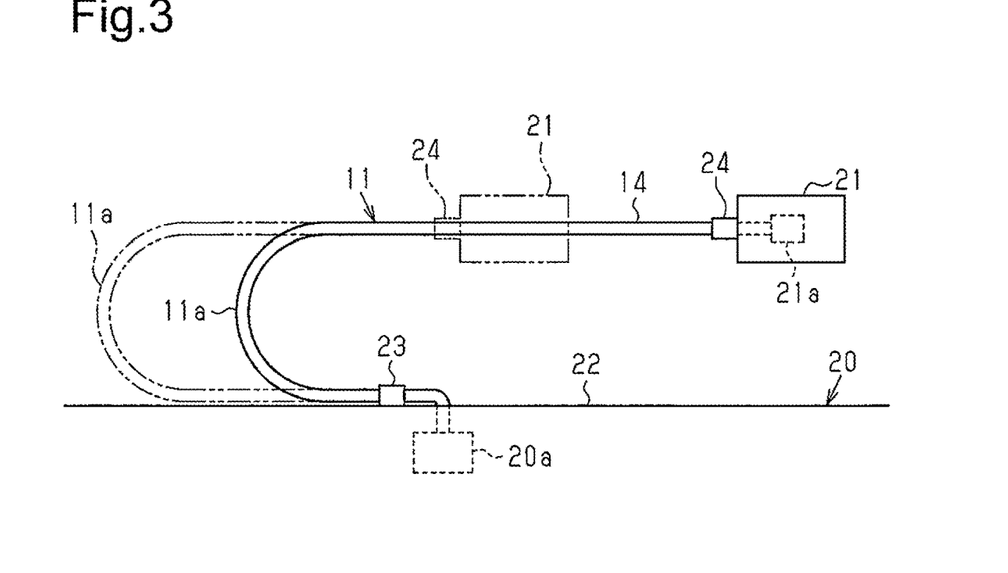
FIG. 3 is a schematic side view showing the cable of FIG. 1 in a state of use.

Referring to FIGS. 2 and 3, the cable 11 is used to supply electric power from a power supply 20a in a facility 20 to an electric device 21a of a movable body 21 that is movable relative to the facility 20. In this case, each coated wire 12 of the cable 11 includes a first end that is electrically connected to a power supplying terminal of the power supply 20a in the facility 20 and a second end that is electrically connected to a power receiving terminal of the electric device 21a of the movable body 21. This allows the necessary electric power to be supplied from the power supply 20a in the facility 20 through the coated wires 12 to the electric device 21a of the movable body 21.

More specifically, the first end of the cable 11 serves as a fixed end fixed by a first fixing member 23 to a predetermined position on a coupling surface 22 that is substantially parallel to the movement path of the facility 20 along which the movable body 21 reciprocates. In this case, the multi-joint support member 13 is omitted from the portion of the cable 11 that is closer to the power supply 20a than the first fixing member 23. The second end of the cable 11 serves as a movable end fixed by a second fixing member 24 to a surface of the movable body 21. In this case, the multi-joint support member 13 is omitted from the portion of the cable 11 that is closer to the electric device 21a than the second fixing member 24.

Between the first fixing member 23 and the second fixing member 24, the cable 11 extends from the fixed end (first end) in a direction opposite to the direction extending toward the movable end (second end) with respect to a movement direction of the movable body 21. Further, the cable 11 forms a semi-arcuate curved portion 11a that reverses the direction in which the cable 11 extends. The cable 11 extends substantially straight in midair from the curved portion 11a to the movable end in the movement direction of the movable body 21. Thus, the curved portion 11a of the cable 11 reciprocates when following reciprocation of the movable body 21.

Figure 4:
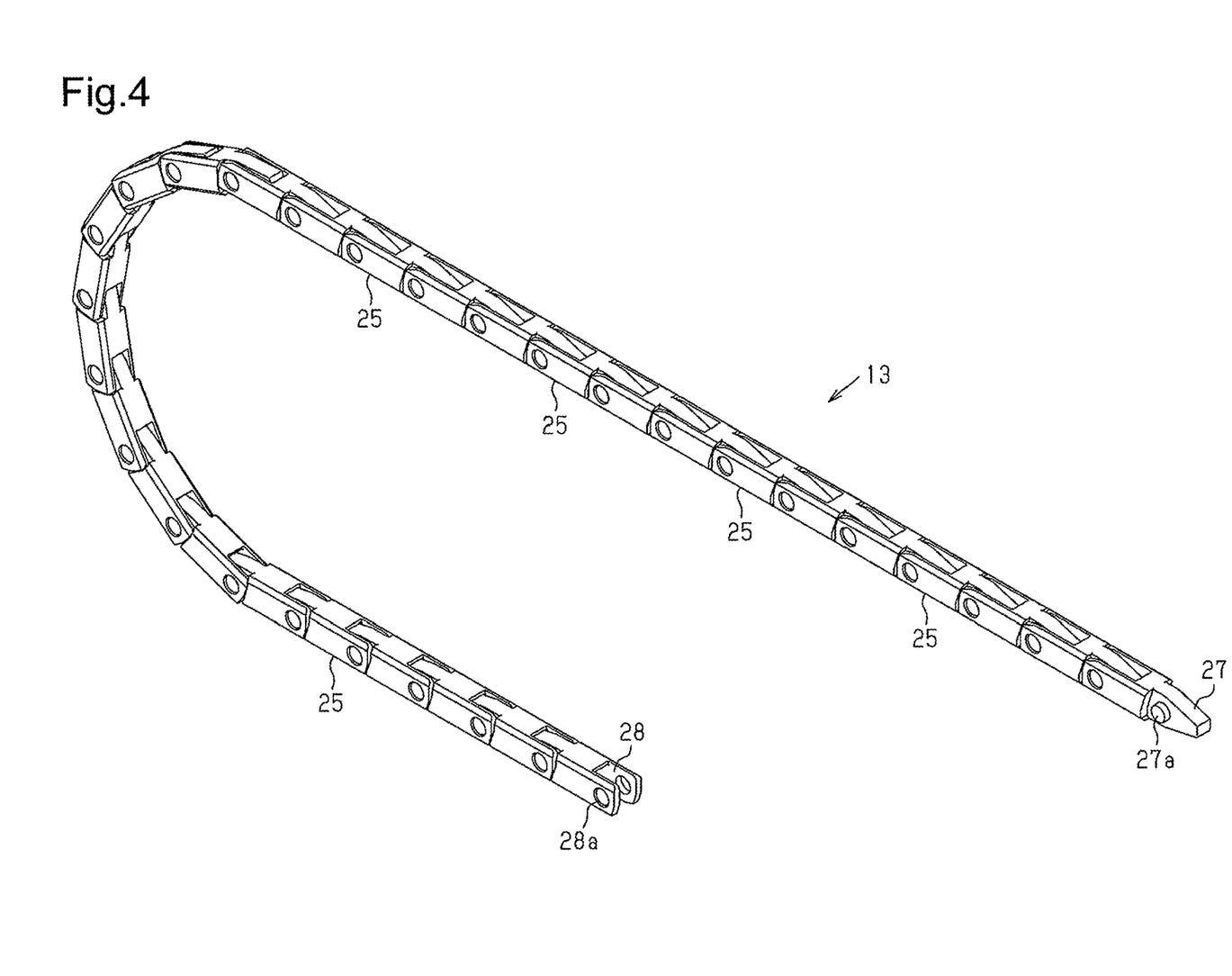
FIG. 4 is a perspective view showing a multi-joint support member that forms the cable of FIG. 1.

As shown in FIGS. 3 and 4, the multi-joint support member 13 is famed by a plurality of link members 25 arranged in series, with adjacent link members 25 pivotally coupled to each other. The multi-joint support member 13 can be turned until becoming equal to a predetermined radius of curvature R (refer to FIG. 7) in a first direction in a direction intersecting a serial direction (longitudinal direction) of the link members 25. The turning of the multi-joint support member 13 in a second direction, which is opposite to the first direction, is restricted.

More specifically, the multi-joint support member 13 can be bent until becoming equal to the predetermined radius of curvature R (refer to FIG. 7) in the first direction and cannot be further bent from a straight state in the second direction, which is opposite to the first direction. In other words, when the cable 11 is fixed to the facility 20 at the fixed end (first end) and fixed to the movable body 21 at the movable end (second end), the minimum radius of curvature of the multi-joint support member 13 is set so that the radius of curvature of the curved portion 11a famed between the fixed end of the cable 11 and the movable end of the cable 11 is not smaller than the predetermined radius of curvature.

The portion of the cable 11 extending in midair substantially in the horizontal direction between the curved portion 11a and the movable end receives the force acting in a drooping direction and generated by the weight of the cable 11. This portion of the cable 11 is configured not to bend from the straight state in the direction opposite to the direction in which the multi-joint support member 13 is bendable. This restricts bending of the cable 11 in the drooping direction.

The structures of the link members 25 that form the multi-joint support member 13 will now be described.

Figure 5:
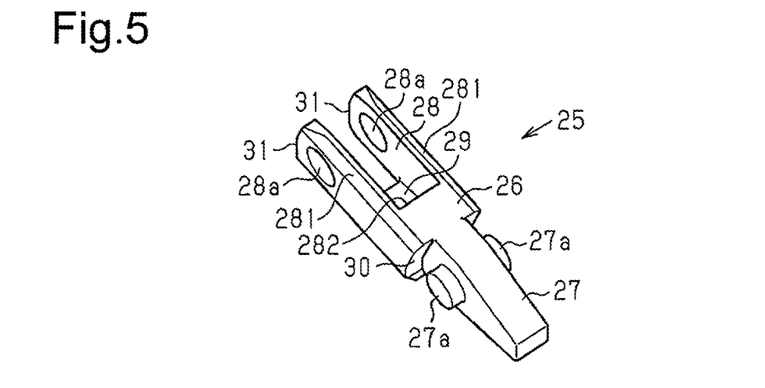
FIG. 5 is a perspective view showing a link member that forms the multi-joint support member.

As shown in FIGS. 4 and 5, each link member 25 includes a block-shaped base 26, an extension 27 that extends from the central portion of the front of the base 26 and is narrower than the base 26, and a recess 28 formed at the rear of the base 26. The extension 27 of the adjacent link member 25 can be inserted into the recess 28. Two pins 27a project from the two sides of the extension 27.

Figure 6:
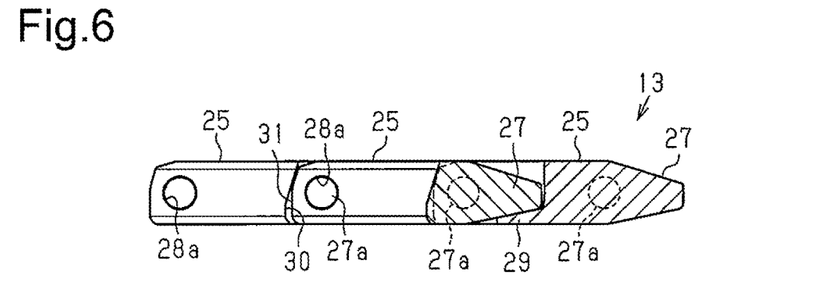
FIG. 6 is a partially cutaway side view showing the multi-joint support member in a straight arrangement.

The recess 28 of the base 26 is defined by two side walls 281 and a bottom wall 282. The two side walls 281 include two holes 28a that extend through the side walls 281. The recess 28 includes a plate-like first restriction portion 29 arranged to connect the two side walls 281 and the bottom wall 282. As shown in FIGS. 5 and 6, two recessed second restriction portions 30 are formed in a front surface of the base 26 at two opposite sides of the extension 27.

Distal end surfaces of the two side walls 281 form abutment surfaces 31. The two second restriction portions 30 of the adjacent link member 25 can abut against the abutment surfaces 31. The two pins 27a of one of two adjacent link members 25 are inserted into the two holes 28a of the other one of the two adjacent link members 25 so that the two adjacent link members 25 are pivotal about the two pins 27a.

As shown in FIG. 6, when the extension 27 of one of the two adjacent link members 25 abuts against the first restriction portion 29 in the recess 28 of the other one of the two adjacent link members 25, bending (turning) of the multi-joint support member 13 from the straight arrangement (arrangement shown in FIG. 6) in the second direction (upper side in FIG. 6) is restricted.

Figure 7:
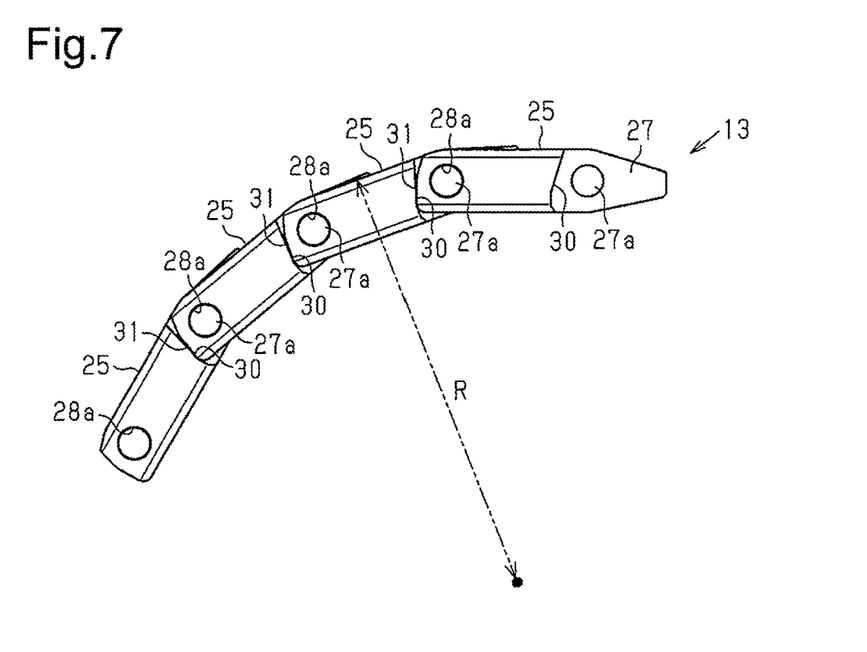
FIG. 7 is a side view showing the multi-joint support member in a bent arrangement.

As shown in FIG. 7, when the two second restriction portions 30 of one of the two adjacent link members 25 abut against the two abutment surfaces 31 of the other one of the two adjacent link members 25, bending (turning) of the multi-joint support member 13 in the first direction (lower side in FIG. 7) is limited at the predetermined radius of curvature R. That is, bending (turning) of the multi-joint support member 13 in the first direction is limited at the predetermined radius of curvature R. In this manner, the multi-joint support member 13 is configured not to bend to a radius of curvature that is less than the predetermined radius of curvature R. The arrangement of the multi-joint support member 13 when the multi-joint support member 13 is bent (turned) to the predetermined radius of curvature R in the first direction is referred to as the bent arrangement (arrangement shown in FIG. 7).

The operation of the cable 11 will now be described.

As shown in FIGS. 1 and 3, the cable 11 is arranged to connect the electric device 21a of the movable body 21, which is movable relative to the facility 20, and the power supply 20a in the facility 20. Further, the cable 11 includes the multi-joint support member 13. When the movable body 21 reciprocates in one direction (sideward direction in FIG. 3), the cable 11 reciprocates following the reciprocation of the movable body 21 while forming the curved portion 11a.

Since bending (turning) of the multi-joint support member 13 in the first direction is limited at the predetermined radius of curvature R, the radius of curvature of the curved portion 11a of the cable 11 is maintained at a radius that is greater than or equal to the predetermined radius of curvature R. Further, the weight of the cable 11 causes force in the drooping direction to act on a portion of the cable 11 between the curved portion 11a and the second fixing member 24. The drooping direction is the direction in which bending of the multi-joint support member 13 from the straight state is restricted. This reduces the drooping amount of the cable 11.

Thus, the path of the reciprocation of the cable 11 following the reciprocation of the movable body 21 is stabilized. That is, the movement path is substantially constant when the multi-joint support member 13 of the cable 11 reciprocates while repeatedly bending (turning) between the straight arrangement and the bent arrangement following reciprocation of the movable body 21. This limits bending of the cable 11 in an unintended direction and thus reduces the load applied to the cable 11. As a result, the life of the cable 11 can be prolonged.

The above embodiment has the advantages described below.

(1) The cable 11 is formed by covering one multi-joint support member 13 and six coated wires 12 with the sheath member 14. Further, the multi-joint support member 13 can be bent only to the predetermined radius of curvature R in the first direction. This stabilizes the path of the cable 11 when relatively moving the first end of the cable 11, that is, the fixed end fixed to the facility 20, and the second end, that is, the movable end fixed to the movable body 21, in the horizontal direction while forming the curved portion 11a at an intermediate portion of the cable 11.

(2) In the cable 11, the multi-joint support member 13 is covered by the flexible cover member 15. Thus, if the multi-joint support member 13 is repeatedly bent between the straight arrangement and the bent arrangement when the cable 11 reciprocates following the reciprocation of the movable body 21, the cover member 15 avoids direct contact of the multi-joint support member 13 with the coated wires 12. Accordingly, the cover member 15 protects each coated wire 12 from the multi-joint support member 13.

(3) In the cable 11, the multi-joint support member 13 is arranged in the central portion of the sheath member 14, and the six coated wires 12 are arranged between the multi-joint support member 13 and the sheath member 14 to surround the multi-joint support member 13. That is, the multi-joint support member 13 is arranged in the central portion of the sheath member 14 where stress received by the cable 11 during use of the cable 11 is largest. This limits stress received by each coated wire 12 when the cable 11 is used. In addition, the space in the central portion of the sheath member 14 surrounded by the six coated wires 12 is filled with the multi-joint support member 13. This allows the multi-joint support member 13 to function as a filler of the cable 11. Accordingly, the multi-joint support member 13 that functions as the filler increases the tensile strength of the cable 11.

(4) In the cable 11, the multi-joint support member 13 is covered by the sheath member 14. This limits dispersion of abrasion dust, which is produced when the multi-joint support member 13 is repeatedly bent (turned) between the straight arrangement and the bent arrangement, to the outside of the sheath member 14.

(5) The cable 11 includes the multi-joint support member 13 inside the sheath member 14. This increases rigidity as compared to a conventional cable that does not include the multi-joint support member 13.

(6) The cable 11 includes the multi-joint support member 13 inside the sheath member 14. This occupies less space than when the multi-joint support member 13 is arranged on a circumferential surface of the sheath member 14.

(7) The cable 11 includes the multi-joint support member 13 inside the sheath member 14. This reduces noise of the multi-joint support member 13 generated during the use of the cable 11 as compared to when the multi-joint support member 13 is arranged on the circumferential surface of the sheath member 14.

(8) The multi-joint support member 13 is formed from a synthetic resin. This reduces the weight of the multi-joint support member 13 as compared to when the multi-joint support member 13 is famed from metal.

Modified Example

The above embodiment may be modified as described below.

Figure 8:
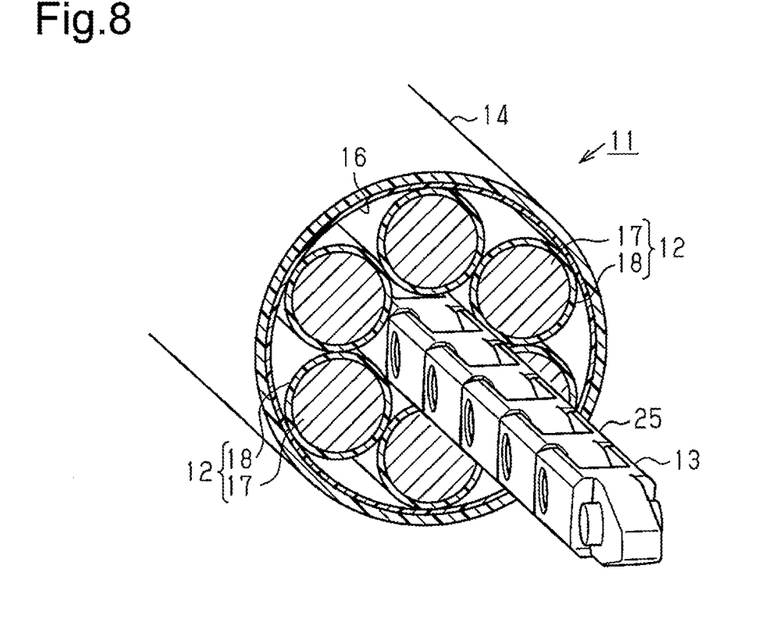
FIG. 8 is an enlarged cross-sectional view showing a main section of a cable of a modified example.

As shown in FIG. 8, in the cable 11, the cover member 15 may be omitted.

Figure 9:
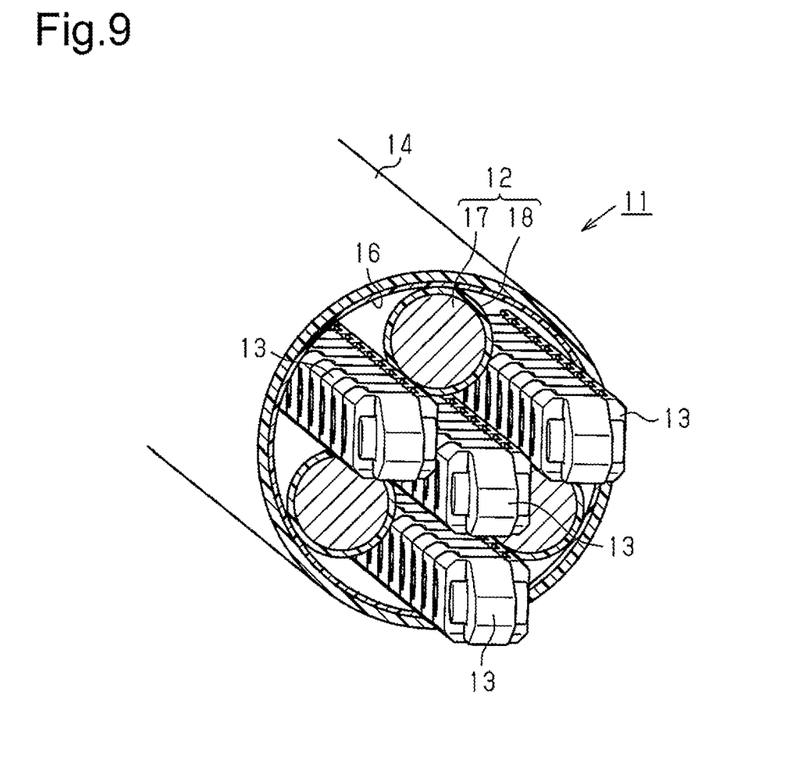
FIG. 9 is an enlarged cross-sectional view showing a main section of a cable of a modified example that differs from the modified example of FIG. 8.

In the cable 11, the number of multi-joint support members 13 and the number of coated wires 12 covered by the sheath member 14 may be changed. For example, as shown in FIG. 9, in the cable 11, three of the six coated wires 12 may be changed to multi-joint support members 13, and the three multi-joint support members 13 and the remaining three coated wires 12 may be alternately arranged in a circumferential direction of the cable 11. In this case, the four multi-joint support members 13, that is, all of the multi-joint support members 13, are arranged so that they are bendable in the same direction. In the cable 11, the arrangement of a plurality of multi-joint support members 13 further increases the rigidity of the cable 11.

Figure 10:
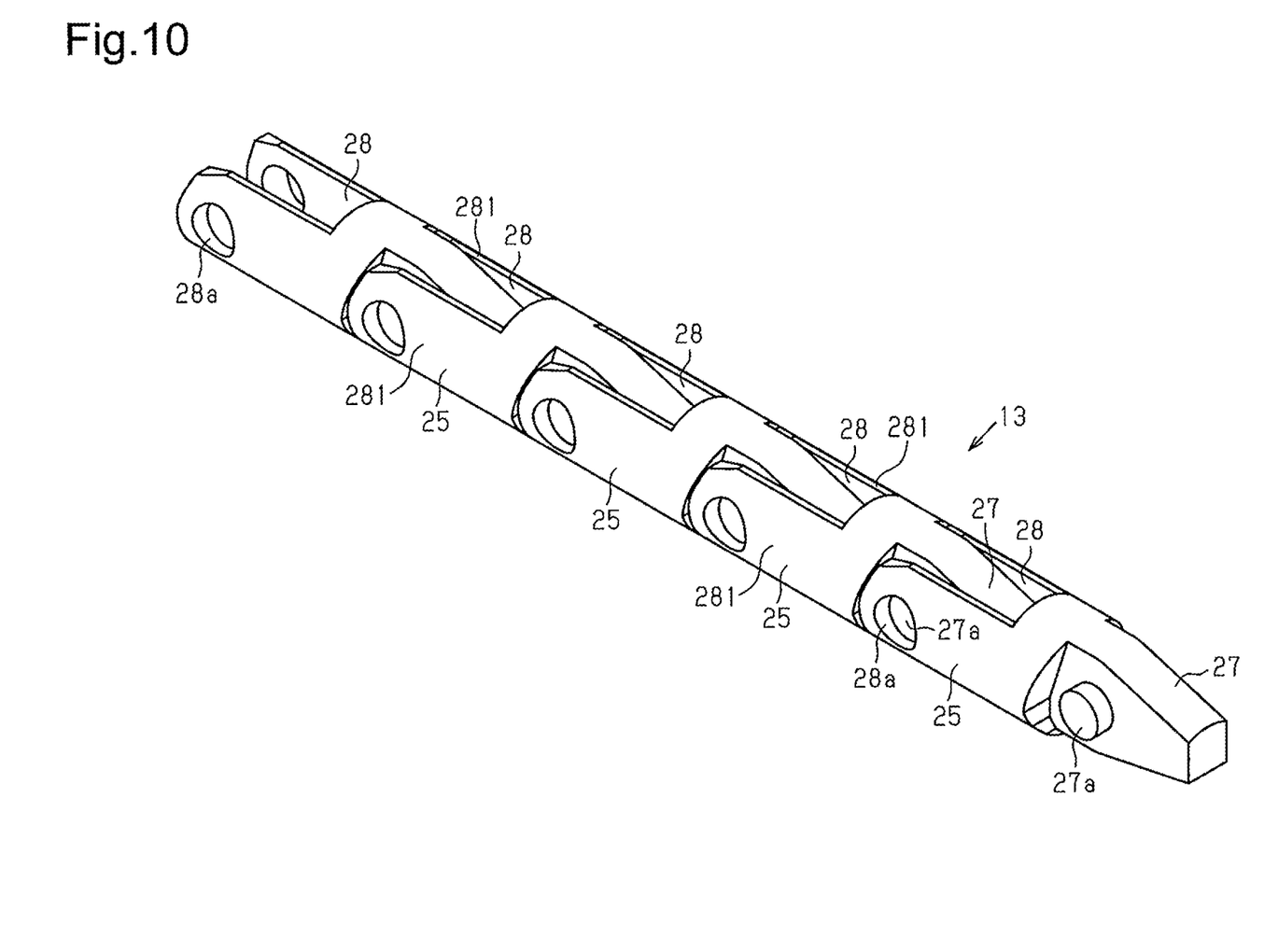
FIG. 10 is a perspective view showing a multi-joint support member of a modified example.

As shown in FIG. 10, the two side walls 281 of each link member 25 of the multi-joint support member 13 may be arcuate so that the multi-joint support member 13 is entirely round.

In the cable 11, the multi-joint support member 13 does not necessarily have to be arranged in the central portion of the sheath member 14.

In the cable 11, the multi-joint support member 13 may be formed from metal.

Instead of the coated wire 12 for supplying power to the movable body 21, the transmission member may be, for example, an optical fiber cable that transmits a signal to the movable body 21 or a hose that supplies the movable body 21 with gas (for example, air) or liquid (for example, water or oil).

DESCRIPTION OF THE REFERENCE NUMERALS

11: Cable
12: Coated wire serving as transmission member
13: Multi-joint support member
14: Sheath member
15: Cover member
25: Link member
R: Predetermined radius of curvature

The invention claimed is:
1. A cable, comprising:
a plurality of flexible transmission members extending in a lengthwise direction of the cable and arranged circumferentially around a center of the cable;
a multi-joint support member formed by pivotally coupling adjacent ones of a plurality of link members arranged in series, wherein turning of the multi joint support member in a first direction in a direction intersecting a serial direction is allowed until becoming equal to a predetermined radius of curvature and turning of the multi joint support member in a second direction, which is opposite to the first direction, is restricted to avoid drooping of the multi joint support member when extending substantially horizontally;
a flexible sheath member that covers the multi joint support member and the plurality of transmission members;
wherein said plurality of link members of the multi joint support member include recesses that are free from external intrusion such that the plurality of link mem- bers of the multi-joint support member are free to pivot with respect to one another;

wherein the multi joint support member is covered by a flexible cover member;

wherein the flexible cover member does not extend into recesses within the multi joint support member such that the plurality of link members of the multi-joint support member are free to pivot;

wherein the flexible cover member has a substantially uniform wall thickness;

wherein the flexible cover member has a substantially circular outer peripheral wall shape cross-sectional shape and a substantially circular inside wall cross-sectional shape; and wherein the flexible sheath member has a substantially circular outer peripheral exterior wall shape cross-sectional shape and a substantially circular interior wall cross-sectional shape.

2. The cable according to claim 1, wherein
the multi-joint support member is arranged in a central portion of the sheath member, and
the plurality of flexible transmission members are arranged between the multi-joint support member and the sheath member.

3. The cable according to claim 1, wherein the multi-joint support member is formed from a synthetic resin.

4. The cable according to claim 1, wherein
the multi-joint support member is one of a plurality of multi-joint support members, and
the sheath member covers the plurality of multi-joint support members.

5. The cable according to claim 1, wherein each one of the plurality of flexible transmission members includes a respective outer coating or cover surrounding a periphery thereof.

6. The cable according to claim 5, wherein each of the respective outer coating or cover surrounding a respective one of the plurality of flexible transmission members is made with a synthetic resin.

7. The cable according to claim 1, wherein the cable includes only one multi joint support member that is the multi joint support member arranged in the central portion of the sheath member, and includes only said plurality of flexible transmission members and each of said plurality of flexible transmission members is circumferentially around said one multi joint support member at a common radial distance therefrom.

8. A cable, comprising:
a plurality of flexible transmission members extending in a lengthwise direction of the cable and arranged circumferentially around a center of the cable;
a multi-joint support member formed by pivotally coupling adjacent ones of a plurality of link members arranged in series, wherein turning of the multi joint support member in a first direction in a direction intersecting a serial direction is allowed until becoming equal to a predetermined radius of curvature and turning of the multi joint support member in a second direction, which is opposite to the first direction, is restricted to avoid drooping of the multi joint support member when extending substantially horizontally;
a flexible sheath member that covers the multi joint support member and the plurality of transmission members;
wherein said plurality of link members of the multi joint support member include recesses that are free from external intrusion such that the plurality of link members of the multi-joint support member are free to pivot with respect to one another; and
wherein each link member includes two side walls and a bottom wall that define one of the recesses, wherein the bottom wall is located between the two side walls, and each side wall has an arcuate cross-sectional shape bulging outwardly so that the multi-joint support member has a rounded shape.

\* \* \* \* \*